United States Patent
Jung

(10) Patent No.: US 9,531,871 B2
(45) Date of Patent: Dec. 27, 2016

(54) ELECTRONIC DEVICE AND METHOD FOR EXTRACTING INCOMING/OUTGOING INFORMATION AND MANAGING CONTACTS

(71) Applicant: Samsung Electronics Co., Ltd., Gyeonggi-do (KR)

(72) Inventor: Ji-Yeon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/942,523

(22) Filed: Nov. 16, 2015

(65) Prior Publication Data
US 2016/0072948 A1    Mar. 10, 2016

Related U.S. Application Data

(63) Continuation of application No. 14/136,800, filed on Dec. 20, 2013, now Pat. No. 9,191,791.

(30) Foreign Application Priority Data

Dec. 24, 2012    (KR) ................ 10-2012-0152408

(51) Int. Cl.
*H04M 3/42* (2006.01)
*H04W 4/12* (2009.01)
*H04W 4/18* (2009.01)
*G06F 3/0488* (2013.01)
*H04L 29/12* (2006.01)

(52) U.S. Cl.
CPC ........ *H04M 3/42059* (2013.01); *G06F 3/0488* (2013.01); *H04L 61/1594* (2013.01); *H04W 4/12* (2013.01); *H04W 4/18* (2013.01)

(58) Field of Classification Search
CPC ............... H04M 3/42042; H04M 3/42051; H04M 3/42059; H04M 3/42068; H04M 3/42093; H04M 3/42102; H04M 3/4211
USPC ........................................... 455/415
See application file for complete search history.

(56) References Cited

U.S. PATENT DOCUMENTS

| | | | |
|---|---|---|---|
| 7,062,534 | B1 | 6/2006 | Henry et al. |
| 2005/0027716 | A1 | 2/2005 | Apfel |
| 2005/0079861 | A1 | 4/2005 | Lim |
| 2005/0090253 | A1 | 4/2005 | Kim et al. |
| 2006/0116172 | A1 | 6/2006 | Jin |
| 2010/0106781 | A1 | 4/2010 | Gupta |

(Continued)

FOREIGN PATENT DOCUMENTS

| | | |
|---|---|---|
| KR | 1020080038722 | 5/2008 |
| KR | 1020090026991 | 3/2009 |

(Continued)

*Primary Examiner* — Christopher M Brandt
(74) *Attorney, Agent, or Firm* — The Farrell Law Firm, P.C.

(57) ABSTRACT

A method and electronic device for extracting incoming/outgoing information and managing contacts are provided. The method includes determining whether a communicating electronic device which has been or is in communication with the electronic device is included as a contact in a first contact list; extracting incoming/outgoing information based on at least one of metadata and contents of the communication with the communicating electronic device when the communicating electronic device is not included as a contact in the first contact list; and displaying the extracted incoming/outgoing information on a touchscreen of the electronic device.

20 Claims, 10 Drawing Sheets

(56) References Cited

U.S. PATENT DOCUMENTS

2010/0251127 A1 9/2010 Geppert et al.
2011/0250874 A1* 10/2011 Shah ................. H04M 3/42042
  455/415
2013/0040602 A1 2/2013 Piccinini et al.

FOREIGN PATENT DOCUMENTS

KR  1020090052012  5/2009
KR  1020110014945  2/2011

* cited by examiner

ELECTRONIC DEVICE AND METHOD FOR EXTRACTING INCOMING/OUTGOING INFORMATION AND MANAGING CONTACTS

PRIORITY

This application is a continuation of, and claims priority under 35 U.S.C. §120, to U.S. patent application Ser. No. 14/136,800, filed on Dec. 20, 2013, issuing as U.S. Pat. No. 9,191,791 on Nov. 17, 2015, and claims priority under 35 U.S.C. §119 to an application filed in the Korean Intellectual Property Office on Dec. 24, 2012 and assigned Serial No. 10-2012-0152408, the entire disclosures of each of which is incorporated herein by reference.

BACKGROUND OF THE INVENTION

1. Field of the Invention

The present invention relates generally to an electronic device and method for extracting incoming/outgoing information and managing contacts and, more particularly, to an electronic device and method for distinguishing, storing, and managing short-term contacts.

2. Description of the Related Art

With the development of functions of electronic devices, electronic devices may now store many details concerning contacts. For example, the electronic device may store not only a telephone number of a specific person, but also other contact details such as a SNS (Social Networking Service) address and an email address of that person.

However, when an electronic device performs communication with a new entity that is not stored as a contact in the electronic device, only the telephone number corresponding to the entity is displayed in the call history list of the electronic device without a user name or company name of the entity. Moreover, since a plurality of entities which are not stored as contacts are displayed in the call history list of the electronic device, the user can not distinguish a specific entity from the other entities when the user wants to perform communication with the specific entity. Therefore, in order to distinguish any of the new entities from each other, the user needs to manually store respective new contacts in the electronic device.

Accordingly, there is a need for an apparatus and method for extracting user information for a new contact in an electronic device from at least one of metadata and contents of a communication when the electronic device has or is having a communication with a new entity (i.e., one not previously stored as a contact), thereby improving the user's convenience.

SUMMARY OF THE INVENTION

Aspects of the present invention are to substantially solve at least the problems and/or disadvantages above and to provide at least the advantages below. Accordingly, an aspect of the present invention is to provide an apparatus and method for automatically extracting incoming/outgoing information and easily storing the name of a call/message originator/receiver whenever a communication with a new entity that is not stored as a contact is performed.

Another aspect of the present invention is to provide an apparatus and method for editing extracted incoming/outgoing information, such as editing the name of a call/message originator/receiver.

Another aspect of the present invention is to provide an apparatus and method for displaying and managing contacts to be used only for a short period of time and contacts to be used for a long period of time differently and/or separately from each other.

According to an aspect of the present invention, a method for operating an electronic device includes determining whether a communicating electronic device which has been or is in communication with the electronic device is included as a contact in a first contact list; extracting incoming/outgoing information based on at least one of metadata and contents of a communication with the communicating electronic device when the communicating electronic device is not included as a contact in the first contact list; and displaying the extracted incoming/outgoing information on a screen of the electronic device.

According to another aspect of the present invention, an electronic device includes a processor unit configured to determine whether a communicating electronic device which has been or is in communication with the electronic device is included as a contact in a first contact list and, when the communicating electronic device is not included as a contact in the first contact list, extracting incoming/outgoing information based on at least one of metadata and contents of a communication with the communicating electronic device; and a touchscreen configured to display the extracted incoming/outgoing information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described herein below with reference to the accompanying drawings. In the following description, detailed descriptions of well-known functions or configurations will be omitted since they would unnecessarily obscure the subject matter of the present invention. Also, the terms used herein are defined according to the functions of specific implementations of the present invention. Thus, the terms may vary depending on users' or operators' intentions or practices. Therefore, the terms used herein should be understood as not limited to the descriptions made herein.

Figure 1A:
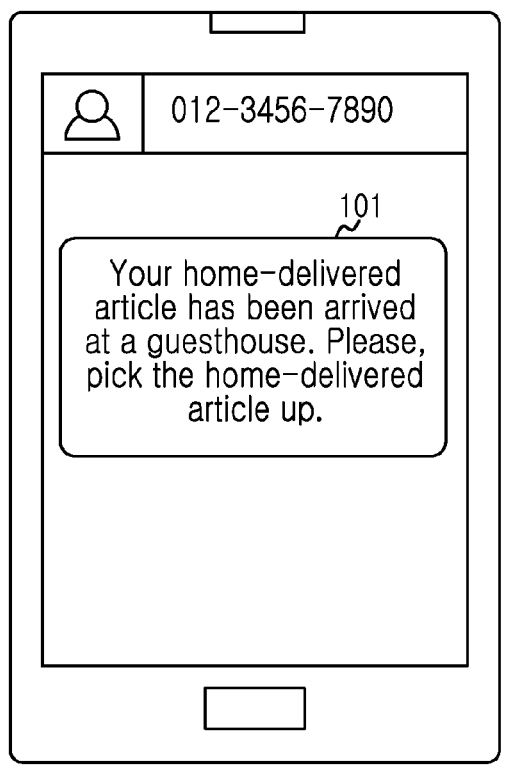
FIGS. 1A and 1B are diagrams generally illustrating extracting incoming/outgoing information and managing contacts in an electronic device according to an embodiment of the present invention.
Figure 1B:
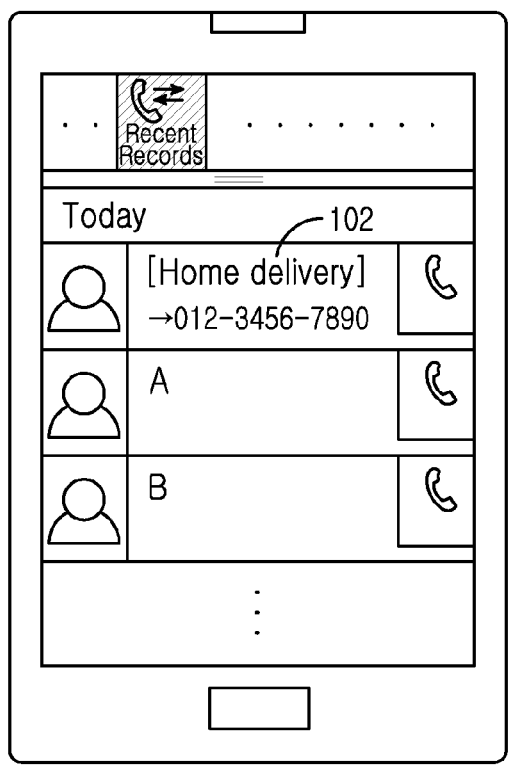

FIGS. 1A and 1B are diagrams generally illustrating extracting incoming/outgoing information and managing contacts on an electronic device according to the present invention. First, after the electronic device has performed communication with any other electronic device, the electronic device determines whether the other electronic device is included as a contact in a first contact list. Herein, the first contact list is a contact list that stores at least one contact that is automatically synchronized with at least one accessible application.

If the communicating electronic device, i.e., the other electronic device that has communicated with the electronic device, is not included as a contact in the first contact list, the electronic device extracts incoming/outgoing information from at least one of the metadata and contents of the communication with the communicating electronic device. In the example illustrated in FIG. 1A, the electronic device receives the message 101 "Your home delivered article has been arrived at a guesthouse. Please, pick the home delivered article up" from a communicating electronic device assigned telephone number "012-3456-7890". The electronic device determines whether the communicating electronic device that transmitted the message is in the first contact list, that is, more specifically, whether the telephone number "012-3456-7890" is included in the first contact list. If the communicating electronic device is not in the first contact list of the electronic device, the electronic device extracts incoming/outgoing information from at least one of the metadata and the contents of the message and/or call. For example, the electronic device may search the contents of one or more messages transmitted to and/or received from the communicating electronic device and extract information associated with the communicating electronic device from the searched contents of the one or more messages.

Herein, searching the contents of messages transmitted to and/or received from the communicating electronic device may refer to searching for a symbol in the contents of the messages or searching for at least one of a term representing a rank, a term representing a name, and a term representing a company name in the contents of the messages. In addition, extracting information associated with the communicating electronic device based on the searched contents of the messages may refer to extracting at least one of a term representing a rank, a term representing a name, and a term representing a company name. In the above-described example, the electronic device may extract the incoming/outgoing information of the communicating electronic device assigned the telephone number "012-3456-7890" based on the contents of messages received from the communicating electronic device assigned the telephone number "012-3456-7890". Specifically, after the electronic device determines the communicating electronic device is not in the first contact list, the electronic device may identify that the term "home delivery" is repeated in the contents of the received message and display the telephone number "012-3456-7890" along with "Home delivery" on the touchscreen of the electronic device, as shown in FIG. 1B.

Thereafter, the electronic device determines if the extracted incoming/outgoing information is to be stored in one of the first contact list and a second contact list. Herein, the second contact list is a contact list that stores at least one contact which is not automatically synchronized with at least one accessible application. Thus, the electronic device determines whether the extracted incoming/outgoing information is to be stored in the first contact list that stores at least one contact which is automatically synchronized with at least one accessible application or the second contact list that stores at least one contact which is not automatically synchronized with at least one accessible application. After the electronic device has received an input from the user for editing the displayed extracted incoming/outgoing information, the electronic device determines whether an input from the user for storing edited incoming/outgoing information in the first contact list has been received. If the electronic device has received input for storing edited incoming/outgoing information in the first contact list, the electronic device stores the edited incoming/outgoing information in the first contact list, i.e., in the contact list that stores at least one contact which is automatically synchronized with at least one accessible application. Storing the edited incoming/outgoing information in the first contact list is appropriate when the new contact will be used continuously and/or over an extended period of time (or indefinitely). That is, the edited incoming/outgoing information may be stored in the first contact list when there is a need to use the new contact in the electronic device for a long period of time, not for a short period of time.

If the electronic device receives an input for editing the extracted incoming/outgoing information but does not receive an input for storing edited incoming/outgoing information in the first contact list, the electronic device stores the edited incoming/outgoing information in the second contact list. Specifically, when the electronic device does not receive the input for storing the edited incoming/outgoing information in the first contact list after receiving the input for editing the extracted incoming/outgoing information, the electronic device stores the edited incoming/outgoing information in the contact list that stores at least one contact which is not automatically synchronized with at least one accessible application. Thereafter, when the electronic device communicates with an electronic device on the second contact list, the electronic device displays the corresponding edited incoming/outgoing information on the touchscreen of the electronic device. In the example illustrated in FIG. 1B, the electronic device associates the telephone number "012-3456-7890" with the name "Home delivery" by editing and then storing them in the second contact list, after which, whenever the electronic device receives a message from the electronic device assigned the telephone number "012-3456-7890", the electronic device displays the message and the name "home delivery" marked with a specific symbol so as to be distinguished from names stored in the first contact list. Also, when the electronic device displays recent call/message records on the touchscreen, the electronic device may display an indication that a message is received from a contact on the second contact list by bracketing its name, i.e., by displaying "[Home delivery]" 102 on the touchscreen of the electronic device.

Even when the communicating electronic device corresponding to the extracted incoming/outgoing information is not stored in either the first or second contact list, it may nevertheless be automatically stored with its corresponding extracted incoming/outgoing information in a previous call/message list. That is, if no input for editing the extracted incoming/outgoing information is received from the user, and thus no information is stored in the first or second contact lists, the information may nonetheless be stored in a previous call/message list such that, when there is communication with the communicating electronic device having information identical to the extracted incoming/outgoing information on the previous call/message list, the electronic device displays the extracted incoming/outgoing information which was never edited. For example, assume that the electronic device communicates with an electronic device assigned the telephone number "012-3456-7890", extracts incoming/outgoing information "home delivery", and displays it on the touchscreen of the electronic device. In addition, assume that the user chooses not to edit the extracted incoming/outgoing information "home delivery", and thus it has not stored as a contact in either the first or second contact list in the electronic device. Even so, when the electronic device again receives a message from the electronic device assigned the telephone number "012-3456-7890", the electronic device displays the received message and the name "Home delivery" marked with a specific symbol so as to distinguish it from contacts stored in the first contact list and the second contact lists.

Conventionally, when an electronic device performs communication with a communicating electronic device that is not stored in a contact list, only the telephone number assigned to the communicating electronic device is recorded. Therefore, when the electronic device again attempts to communicate with the communicating electronic device, it is difficult to figure out what entity corresponds to the telephone number stored in the call records. In addition, when the communicating electronic device does not need to be stored for long term use, it is inconvenient for a user to store a corresponding new contact in the contact list of the electronic device when it will only be used for a short period of time. If the user stores the new contact in the electronic device, the new contact may be automatically synchronized with at least one accessible application in and/or having access to the electronic device. Therefore, the new contact which the user has no acquaintance with is automatically synchronized with the at least one accessible application, thereby causing the user to feel uncomfortable. However, when performing communication with a communicating electronic device not already on a contact list, the electronic device according to embodiments of the present invention extracts incoming/outgoing information based on communication metadata and/or contents, thereby improving the convenience of the user, and, more specifically, the electronic device may store the incoming/outgoing information in any one of a first contact list synchronized with at least one accessible program, a second contact list not synchronized with an accessible program, or a previous call/message list.

Figure 2A:
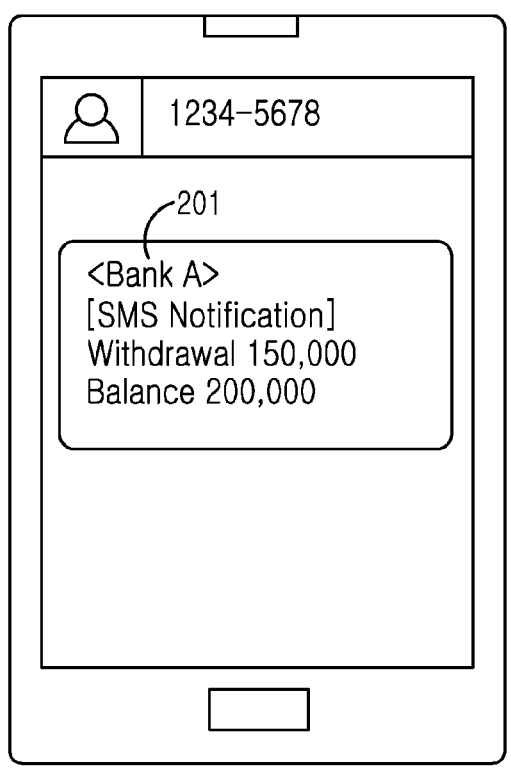
FIGS. 2A and 2B are diagrams illustrating searching the contents of and automatically extracting incoming/outgoing information from a message received from another electronic device according to an embodiment of the present invention.
Figure 2B:
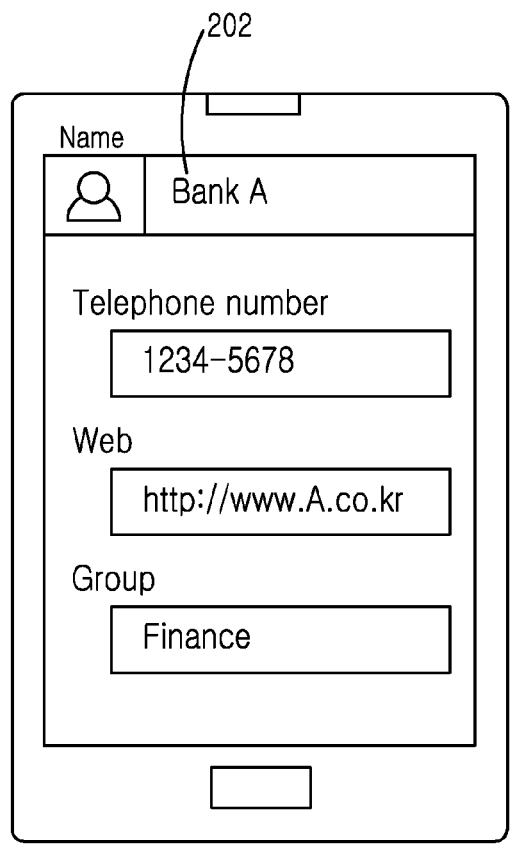

FIGS. 2A and 2B are diagrams illustrating searching the contents of a message and automatically extracting incoming/outgoing information when the message is received from a communicating electronic device according to an embodiments of the present invention. As illustrated in FIG. 2A, the electronic device receives a message from a communicating electronic device, and displays the contents of the received message and the telephone number "1234-5678" assigned to the communicating electronic device together on the touchscreen of the electronic device. That is, since the telephone number of the communicating electronic device is not stored in the electronic device, the electronic device may display only the telephone number "1234-5678", not a name corresponding to the communicating electronic device.

The electronic device determines whether the communicating electronic device is stored as a contact in the first contact list of the electronic device immediately when the electronic device determines that the received message is being viewed by the user or when the electronic device receives the message. If the electronic device determines the telephone number assigned to the communicating electronic device is not stored in the first contact list of the electronic device, the electronic device extracts incoming/outgoing information from the contents of the received message. In the example illustrated in FIG. 2A, the electronic device may search for the term "bank", the term "withdrawal", and/or the term "balance" and analyze the searched entire contents. Thereafter, the electronic device may determine that the telephone number "1234-5678" is a contact associated with a bank by identifying that the terms "bank", "withdrawal", and "balance" are associated with finance. Therefore, the electronic device may automatically extract "bank A" 201 as the name of the electronic device corresponding to the telephone number "1234-5678" from the contents of the message.

In addition, as illustrated in FIG. 2B, the electronic device may execute a web browser provided in the electronic device to search for at least one of a name found in the contents of the message and the telephone number of the communicating electronic device. Thereafter, the electronic device may extract at least one of a web page address corresponding to the name of the communicating electronic device and a main telephone number of the communicating electronic device. In the above-described example, the electronic device may search for the name "bank A" 202 and the telephone number "1234-5678" using the web browser and extract the home page address and main telephone number of "bank A" 202 from the Internet. That is, the electronic device may extract additional information using the web browser based on the name found in the message and the telephone number as well as the contents of the received message. For example, the electronic device may extract additional information, such as the home page address "www.A.co.kr" of "bank A" 202 using the web browser.

In addition, the electronic device may access a database stored in the electronic device, and search for at least one of a name found in the contents of the message and the telephone number of the communicating electronic device using the database. Thereafter, the electronic device may extract, from the database, at least one of a web page address corresponding to the name and a main telephone number of the electronic device. In this case, the database stored in the electronic device may be created and updated by downloading relevant information from a certain server. In addition, the electronic device may receive and/or access updated relevant information through a streaming service from the certain server in real time without storing its own relevant database. In the above-described example, the electronic device may search for the name "bank A" 202 and the telephone number "1234-5678" using the stored database and extract the home page address and main telephone number of "bank A" 202 from the database. That is, the electronic device may extract additional information using the stored database based on the name found from the message and the telephone number as well as the contents of the received message. For example, the electronic device may extract additional information, such as the home page address "www.A.co.kr" of "bank A" 202 using the database.

Figure 3A:
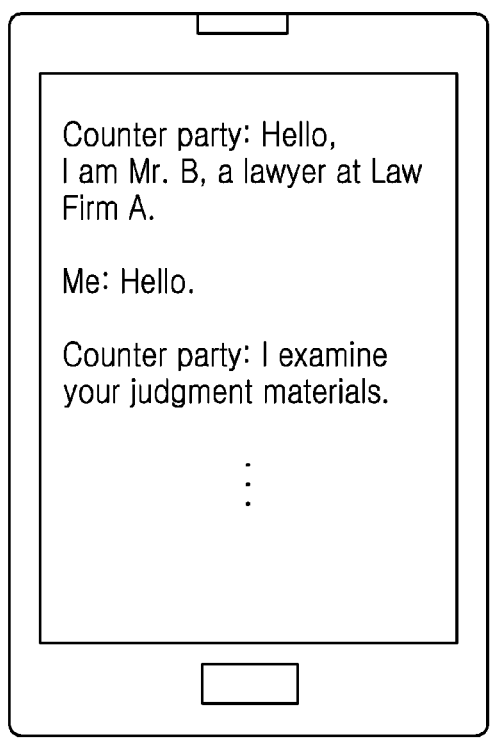
FIGS. 3A and 3B are diagrams illustrating searching telephone conversation contents and automatically extracting incoming/outgoing information when a call to another electronic device is terminated according to an embodiment of the present invention.
Figure 3B:
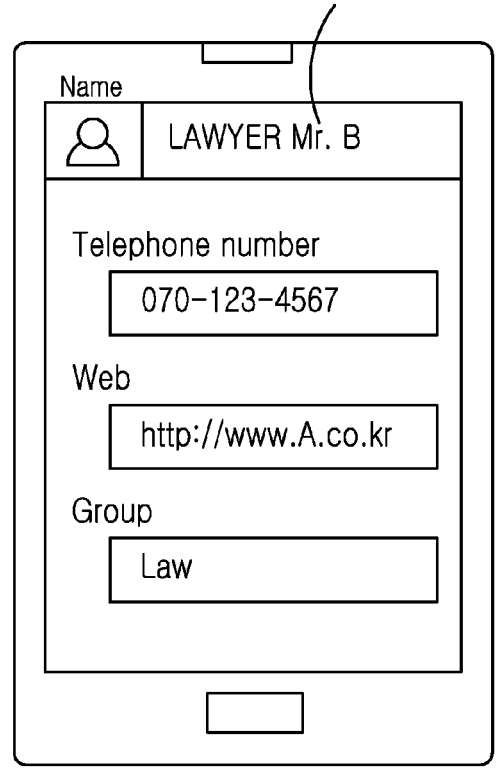

FIGS. 3A and 3B are diagrams illustrating searching telephone conversation contents and automatically extracting incoming/outgoing information when a call to a communicating electronic device is terminated according to an embodiment of the present invention. As illustrated in FIG. 3A, an electronic device performs communication with a communicating electronic device assigned telephone number "1234-5678" Specifically, the electronic device performs voice communication with the communicating electronic device assigned telephone number "1234-5678". After performing voice communication with the communicating electronic device assigned the telephone number "1234-5678", the electronic device determines that the telephone number "1234-5678" is not stored in a first contact list stored in the electronic device, and the electronic device performs STT (Speech To Text) conversion, converting the telephone conversation audio contents to text.

The electronic device may display the converted text of the telephone conversation on the background of the screen. In any event, the electronic device searches the contents of the text and extracts information associated with the communicating electronic device based on the searched contents of the text. Herein, searching the contents of the text may refer to searching for a symbol in the contents of the text or searching for at least one of a term representing a rank, a term representing a name, and a term representing a company name in the contents of the text. In addition, extracting information associated with the communicating electronic device based on the searched contents of the text may refer to extracting at least one of a term representing a rank, a term representing a name, and a term representing a company name.

In the example shown in FIG. 3A, the electronic device converts the audio contents of the telephone conversation with the communicating electronic device assigned telephone number "1234-5678" to a text. The electronic device searches and analyzes the text, and finds the terms "law firm", "lawyer", and "judgment materials". Thereafter, the electronic device determines that the telephone number "1234-5678" is a contact associated with the legal profession by identifying that the terms "law firm", "lawyer", and "judgment materials" are associated with the law. In such a manner, the electronic device automatically extracts "lawyer Mr. B" as the name of the communicating electronic device corresponding to the telephone number "1234-5678" from the contents of the text.

In addition, as illustrated in FIG. 3B, the electronic device may execute a web browser provided in the electronic device and search for at least one of a name found in the contents of the text and the telephone number of the electronic device using the web browser. Thereafter, the electronic device may extract at least one of a web page address corresponding to the name and a main telephone number of the electronic device from the Internet. In the example illustrated in FIG. 3B, the electronic device may search for the company name "law firm A", the name "lawyer Mr. B" 301 and/or the telephone number "1234-5678" using the web browser and may extract the home page address and main telephone number of "law firm A" from the results of that search. That is, the electronic device may extract additional information using the web browser based on the contents of the text, such as a name and position found in the text, and the telephone number. For example, the electronic device may extract additional information such as the home page address "www.A.co.kr" of the "law firm A" using the web browser. In addition, the electronic device may extract a main telephone number "070-123-4567" of the "law firm A" and store the main telephone number instead of the telephone number "1234-5678" of the communicating electronic device.

In addition, the electronic device may access a database stored in the electronic device, and search for at least one of a name found in the contents of the text and the telephone number of the electronic device using the database. Thereafter, the electronic device may extract at least one of a web page address corresponding to the name and a main telephone number of the electronic device. The database stored in the electronic device may be created and updated by downloading relevant information from a certain server. In addition, the electronic device may receive updated relevant information through a streaming service from the certain server in real time without storing its own database. In the example illustrated in FIG. 3B, the electronic device may extract additional information such as the home page address "www.A.co.kr" of the "law firm A" using a database. In addition, the electronic device may extract a main telephone number "070-123-4567" of the "law firm A" using a database and store the main telephone number instead of the telephone number "1234-5678".

Figure 4A:
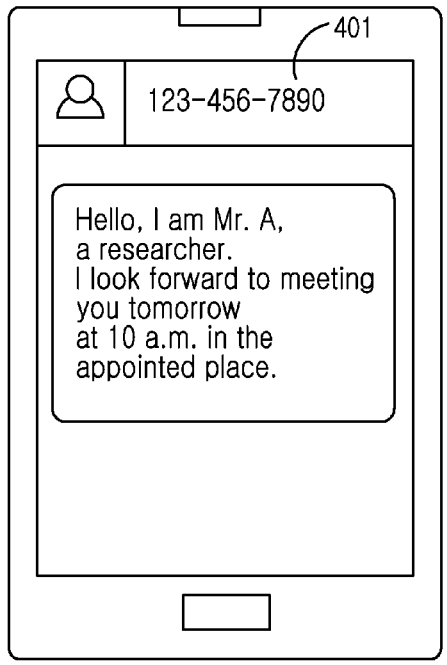
FIGS. 4A to 4C are diagrams illustrating displaying extracted incoming/outgoing information when the user does not want to edit the extracted incoming/outgoing information according to an embodiment of the present invention.
Figure 4B:
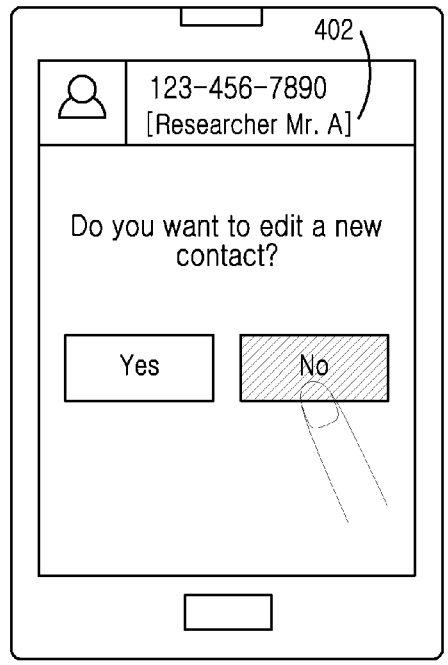
Figure 4C:
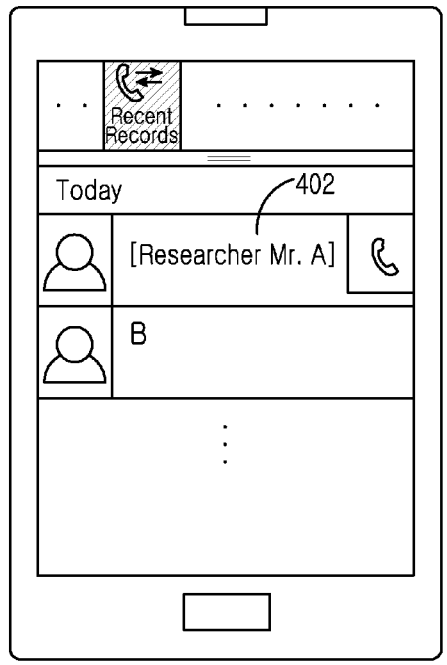

FIGS. 4A to 4C are diagrams illustrating displaying and storing extracted incoming/outgoing information without editing when the user does not provide input for editing the extracted incoming/outgoing information according to an embodiment of the present invention. Referring to FIG. 4A, when the electronic device performs communication with a communicating electronic device, the electronic device determines whether the telephone number assigned to the communicating electronic device is included in a first contact list. If the electronic device determines that the telephone number assigned to the communicating electronic device is not included in the first contact list, the electronic device searches the contents of the message received from the communicating electronic device and automatically extracts incoming/outgoing information. In the example shown in FIGS. 4A and 4B, the electronic device has received a message from a communicating electronic device assigned telephone number "123-456-7890" 401 and extracted the incoming/outgoing information "researcher Mr. A" as a result of searching the contents of the received message.

The electronic device displays the extracted incoming/outgoing information and waits for an input from the user indicating whether the user wishes to edit a new contact as illustrated in FIG. 4B. In this embodiment, if the user chooses not to edit the extracted information as shown in FIG. 4B, the extracted information is stored in a Recent Records list as shown in FIG. 4C, such that, if the electronic device performs communication with an electronic device on the Recent Records list, the electronic device displays the extracted incoming/outgoing information of the communicating electronic device which was stored without editing. For example, after the electronic device performs communication with an electronic device assigned the telephone number "123-456-7890", and extracts and displays the incoming/outgoing information "Researcher Mr. A" 402 on the touchscreen, the user of the electronic device does not edit the displayed extracted incoming/outgoing information "Researcher Mr. A" 402. Later, when the electronic device again receives a message from the communicating electronic device assigned the telephone number "123-456-7890", the electronic device displays the received message and the name "[Researcher Mr. A]" 402 marked with a specific symbol so as to be distinguished from contacts stored in the first and second contact lists.

Figure 5A:
FIGS. 5A to 5D are diagrams illustrating storing edited incoming/outgoing information in a first contact list after the user has edited the extracted incoming/outgoing information according to an embodiment of the present invention.

FIGS. 5A to 5D are diagrams illustrating editing and then storing edited incoming/outgoing information from a received message in a first contact list according to an embodiment of the present invention. Referring to FIG. 5A, the electronic device performs communication with a communicating electronic device. When the electronic device performs communication with the communicating electronic device, the electronic device determines whether the telephone number assigned to the communicating electronic device is included in the first contact list. If the electronic device determines that the telephone number assigned to the communicating electronic device is not included in the first contact list, the electronic device searches the contents of the message received from the communicating electronic device and automatically extracts incoming/outgoing information. As illustrated in the example shown in FIGS. 5A-5D, the electronic device receives a message from a communicating electronic device assigned the telephone number "1234-5678" 501, which the electronic device determines is not in the first contact list, so the electronic device searches the contents of the received message. When the electronic device searches the contents of the received message, i.e., "Hello dear customer Mr. A, glasses shop B is messaging to inform you that your requested glasses are stocked. Thank you", the electronic device extracts incoming/outgoing information, such as "glasses shop B", as a result of finding and analyzing the terms "dear customer", "glasses shop" and "stocked" in the received message.

Figure 5B:
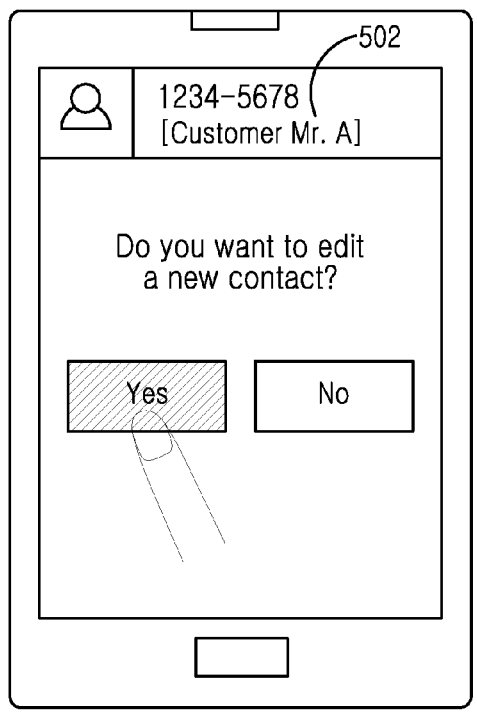

However, when the electronic device extracts unwanted incoming/outgoing information from the received message as illustrated in FIG. 5B ("Customer Mr. A" 502), the user of the electronic device provides an input configured for editing a new contact. In the above example, when the electronic device receives the message from the electronic device assigned the telephone number "1234-5678", the electronic device should extract incoming/outgoing information "glasses shop B". However, if the electronic device extracts incoming/outgoing information "dear customer Mr. A", the electronic device may receive a user input for editing the new contact. By means of this user input, the user may edit the incoming/outgoing information when there is typographical error in the extracted incoming/outgoing information or when the user wants to use another piece of incoming/outgoing information instead of the extracted incoming/outgoing information.

Figure 5C:
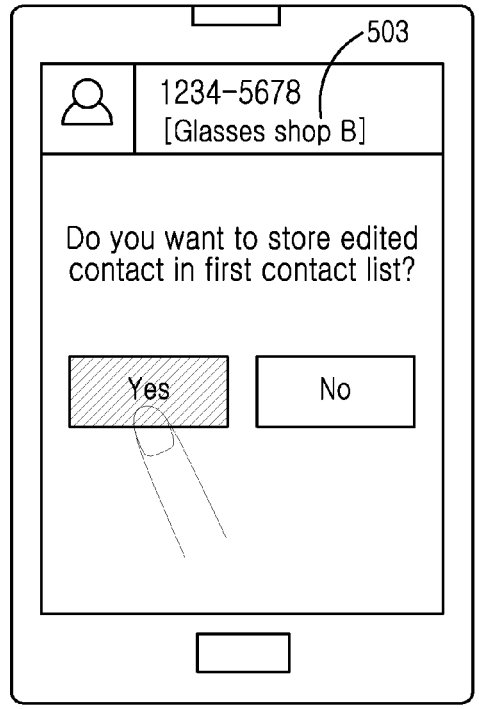

After editing the extracted incoming/outgoing information, if the electronic device receives a user input configured for storing the edited incoming/outgoing information in a first contact list as illustrated in FIG. 5C, the electronic device stores the edited incoming/outgoing information in the first contact list, i.e., in the contact list that stores at least one contact which is automatically synchronized with at least one accessible application. In this case, it is a benefit to store the edited incoming/outgoing information in the first contact list when the new contact will be used continuously. Furthermore, it is a benefit to store the edited incoming/outgoing information in the first contact list when there is a need to use the newly-recorded contact in the electronic device for a long period of time, not for a short period of time.

Figure 5D:
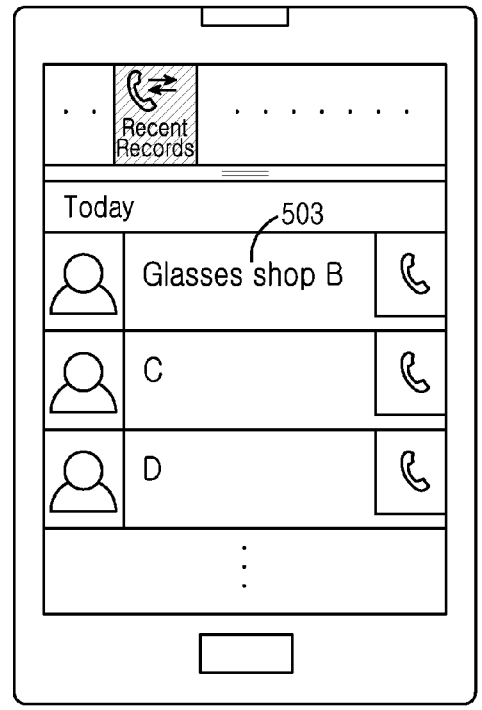

As stated above, when the electronic device receives an input for storing an edited contact in the first contact list as in the above-described example, the electronic device stores the edited contact in the first contact list, thereby causing the edited contact to be automatically synchronized with at least one accessible application. In addition, when the electronic device displays recent call/message records as illustrated in FIG. 5D, the edited name of the contact is displayed on the touchscreen of the electronic device. The electronic device shown in FIG. 5D has performed communications with communicating electronic devices corresponding to stored names "D" and "C" in turn and most recently has performed communication with the electronic device assigned telephone number "1234-5678", i.e., with the communicating electronic device in FIGS. 5A-5C. In above example, since the contacts of the names "D", "C" and "Glasses shop B" 503 are stored in the first contact list of the electronic device where the electronic device displays recent call/message records on the touchscreen, the electronic device displays the contacts of the names "D", "C" and "Glasses shop B" 503 in turn.

Figure 6A:
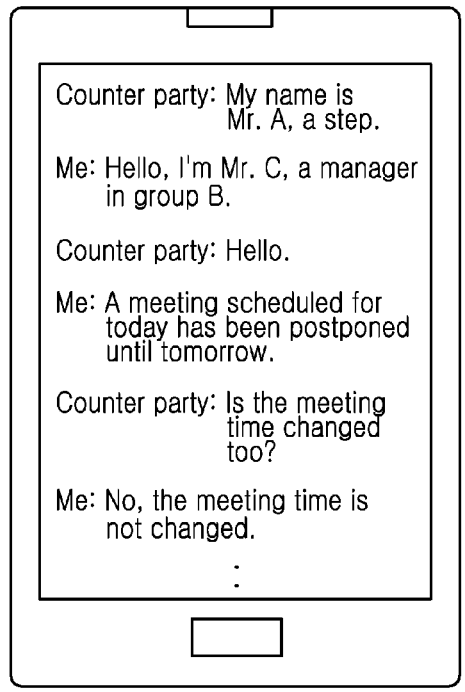
FIGS. 6A to 6D are diagrams illustrating storing edited incoming/outgoing information in a second contact list after input for editing the extracted incoming/outgoing information is received from the user according to an embodiment of the present invention.

FIGS. 6A to 6D are diagrams illustrating editing and then storing edited incoming/outgoing information in a second contact list according to an embodiment of the present invention. Referring to FIG. 6A, when the electronic device performs communication with a communicating electronic device, the electronic device determines whether the telephone number assigned to the communicating electronic device is included in a first contact list. If it is determined that the telephone number of the communicating electronic device is not included in the first contact list, the electronic device extracts information about the terminating and/or originating calls (also referred to as incoming/outgoing information) based on at least one of metadata and contents of the communication(s). In the example, the communicating electronic device is assigned the telephone number "012-345-6789", which the electronic device determines is not stored in a first contact list stored in the electronic device. When the electronic device determines that the telephone number "012-345-6789" is not stored in the first contact list, the electronic device performs STT (Speech To Text) conversion on the telephone conversation contents.

Figure 6B:
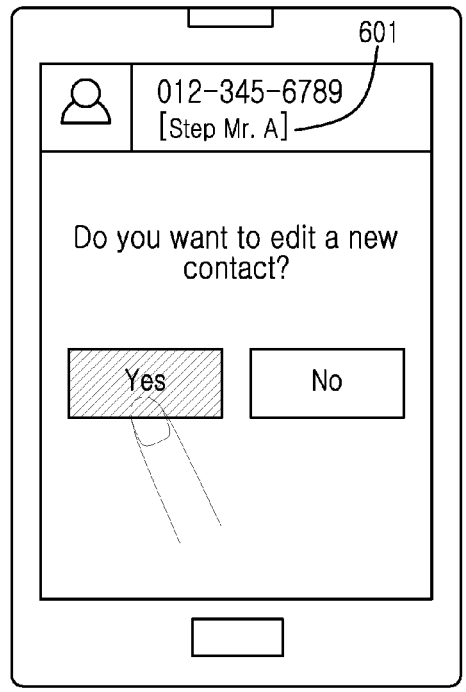

That is, the electronic device converts the telephone conversation audio contents to text which is displayed on the screen and searched. Thereafter, the electronic device extracts information associated with the communicating electronic device based on the searched contents of the text. Herein, searching the contents of the text may refer to searching for a symbol in the contents of the text or searching for at least one of a term representing a rank, a term representing a name, and a term representing a company name in the contents of the text. In addition, extracting information associated with the communicating electronic device based on the searched contents of the text may refer to extracting at least one of a term representing a rank, a term representing a name, and a term representing a company name. As illustrated in FIGS. 6A and 6B, the electronic device has searched and found the terms "step Mr. A" and "meeting" in the contents of the text of the telephone conversation. Thereafter, the electronic device identifies the term "step A" as representing the name and "012-345-6789" as the telephone number of a new contact associated with A. Thus, the electronic device has automatically extracted "step A" as the name of the electronic device corresponding to the telephone number "012-345-6789" from the contents of the text.

In cases such as illustrated in FIG. 6B, when the electronic device extracts unwanted incoming/outgoing information when searching the contents of the text of the telephone conversation, the electronic device receives, from the user, an input configured for editing a new contact. In this specific case, since there is an erroneous recognition due to inaccurate pronunciation when converting the telephone conversation contents to text in the electronic device, the electronic device receives an input for editing erroneous incoming/outgoing information. In addition, the user may edit the incoming/outgoing information when there is typographical error in the extracted incoming/outgoing information or the user wants to use another piece of incoming/outgoing information instead of the extracted incoming/outgoing information. In above example, the user of the communicating electronic device intended to pronounce "staff A" not "step A". Therefore, the user of the electronic device provides an input configured for editing the extracted incoming/outgoing information that is displayed as "[Step Mr. A]" 601.

Figure 6C:
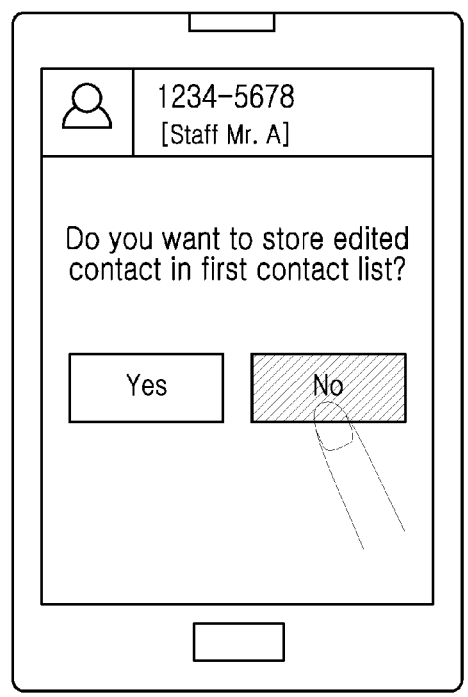

If the user of the electronic device edits the extracted incoming/outgoing information, but does not provide input configured for storing the edited incoming/outgoing information in the first contact list (as shown by pressing the "No" button as illustrated in FIG. 6C), the electronic device stores the edited incoming/outgoing information in the second contact list that stores at least one contact which is not automatically synchronized with at least one accessible application. For example, if contact "012-345-6789" is stored in the second contact list of the electronic device, and a conversation application "application A" of the electronic device performs automatic synchronization on contacts stored in the electronic device, "application A" does not perform automatic synchronization on the contact "012-345-6789" that is newly registered in the second contact list. By these means, the user can store a contact for an unacquainted person in the second contact list, or any contact being used for a short period of time, because the contact will not automatically synchronized with all applications stored in the electronic device.

Figure 6D:
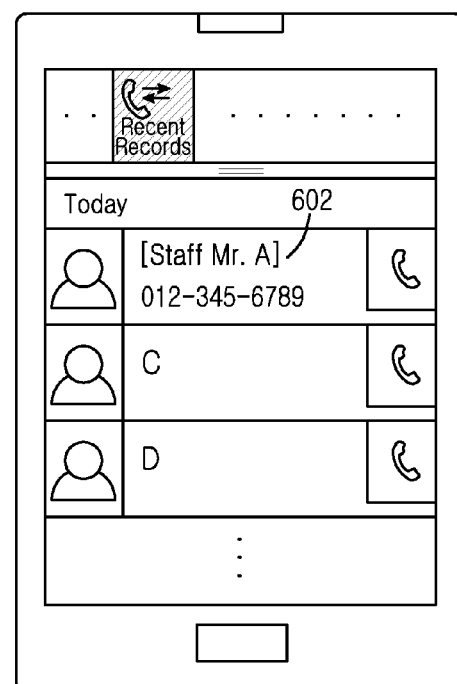

As illustrated in FIG. 6D, when the electronic device displays recent call/message records, the edited name of the contact in the second contact list is displayed on the touchscreen of the electronic device. In FIG. 6D, the electronic device has performed communications with electronic devices corresponding to stored names "D" and "C" in turn and most recently with the communicating electronic device assigned telephone number "012-345-6789", for which incoming/outgoing information has been extracted, edited, and then stored in the second contact list. In this example, since contacts of names "D" and "C" are stored in the first contact list of the electronic device, the electronic device displays the contacts of names "D" and "C" with no brackets, while the electronic device displays the name "[Staff Mr. A]" 602 marked with a specific symbol (in this case, brackets) so as to be distinguished from names stored in the first contact list. Through these means, when the electronic device displays recent call/message records on the touchscreen, the electronic device displays an indication that communication with "[Staff Mr. A]" 602 has been performed on the touchscreen of the electronic device, even though the contact for "Staff Mr. A" has not been added to the first contact list.

Figure 7A:
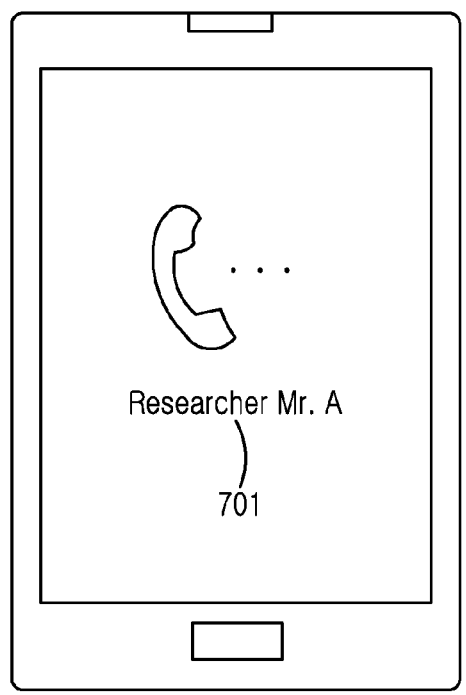
FIGS. 7A and 7B are diagrams illustrating displaying a contact from the first contact list on a touchscreen or displaying a contact from the second contact list or which has previously been in communication with the electronic device on a touchscreen, respectively, according to an embodiment of the present invention.
Figure 7B:
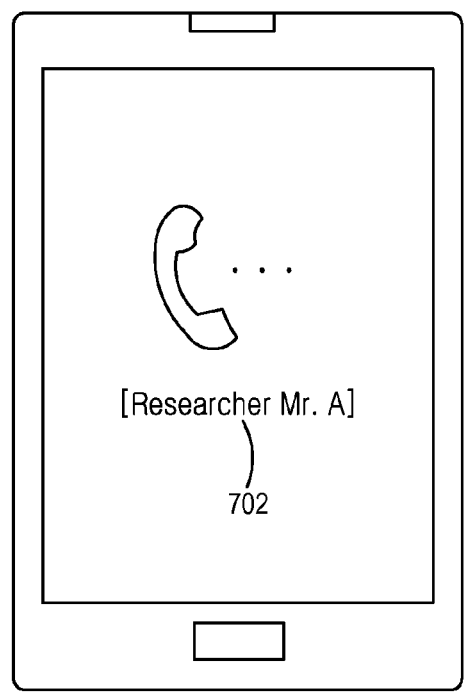

FIGS. 7A and 7B are diagrams illustrating displaying a call is received from a communicating electronic device which is stored in a first contact list or a communicating electronic device which is stored on a second contact list or which has previously performed communication (and thus is on a previous call/message list). When an electronic device receives a call from any electronic device which has performed communication with the electronic device one or more times, the electronic device displays a contact of the communicating electronic device on the touchscreen of the electronic device. First, when the electronic device receives a call from an electronic device corresponding to a contact stored in the first contact list of the electronic device, the electronic device displays the contact stored in the first contact list on the touchscreen of the electronic device as illustrated in FIG. 7A. In this example, the electronic device has stored telephone number "1234-5678" with the name "Researcher Mr. A" in the first contact list of the electronic device, and, when the electronic device receives a call from the communicating electronic device assigned telephone number "1234-5678", the electronic device displays the name "Researcher Mr. A" 701 stored in the first contact list on the touchscreen of the electronic device. By such means, the user may check the format of the contact that is being displayed on the touchscreen of the electronic device to determine whether the contact is stored in the first contact list. In this specific example, when the contact is displayed without a predetermined symbol, the user may identify that the contact is on the first contact list, and thus is likely a person which the user has acquaintance with or wants to keep in touch with for a long period of time.

However, when the electronic device receives a call from an electronic device corresponding to a contact stored in the second contact list or from an electronic device corresponding to the incoming/outgoing information extracted stored without editing, the electronic device displays the contact on the touchscreen of the electronic device as illustrated in FIG. 7B. In this example, the electronic device stores telephone number "1234-5678" along with name "Researcher Mr. A" in the second contact list of the electronic device or the incoming/outgoing information "Researcher Mr. A" was extracted and stored when the electronic device previously performed communication with the communicating electronic device assigned telephone number "1234-5678". When the electronic device receives a call from the electronic device assigned telephone number "1234-5678", the electronic device displays "[Researcher Mr. A]" 702 on the touchscreen of the electronic device. In this manner, the user can check the format of the contact that is being displayed on the touchscreen of the electronic device and determine whether the contact is stored in the first contact list. In this specific example, when the contact is displayed with a predetermined symbol and/or otherwise marked (in this case, bracketed), the user can identify the contact as an unacquainted person which the user only wanted to get in touch with for a short time.

Figure 8:
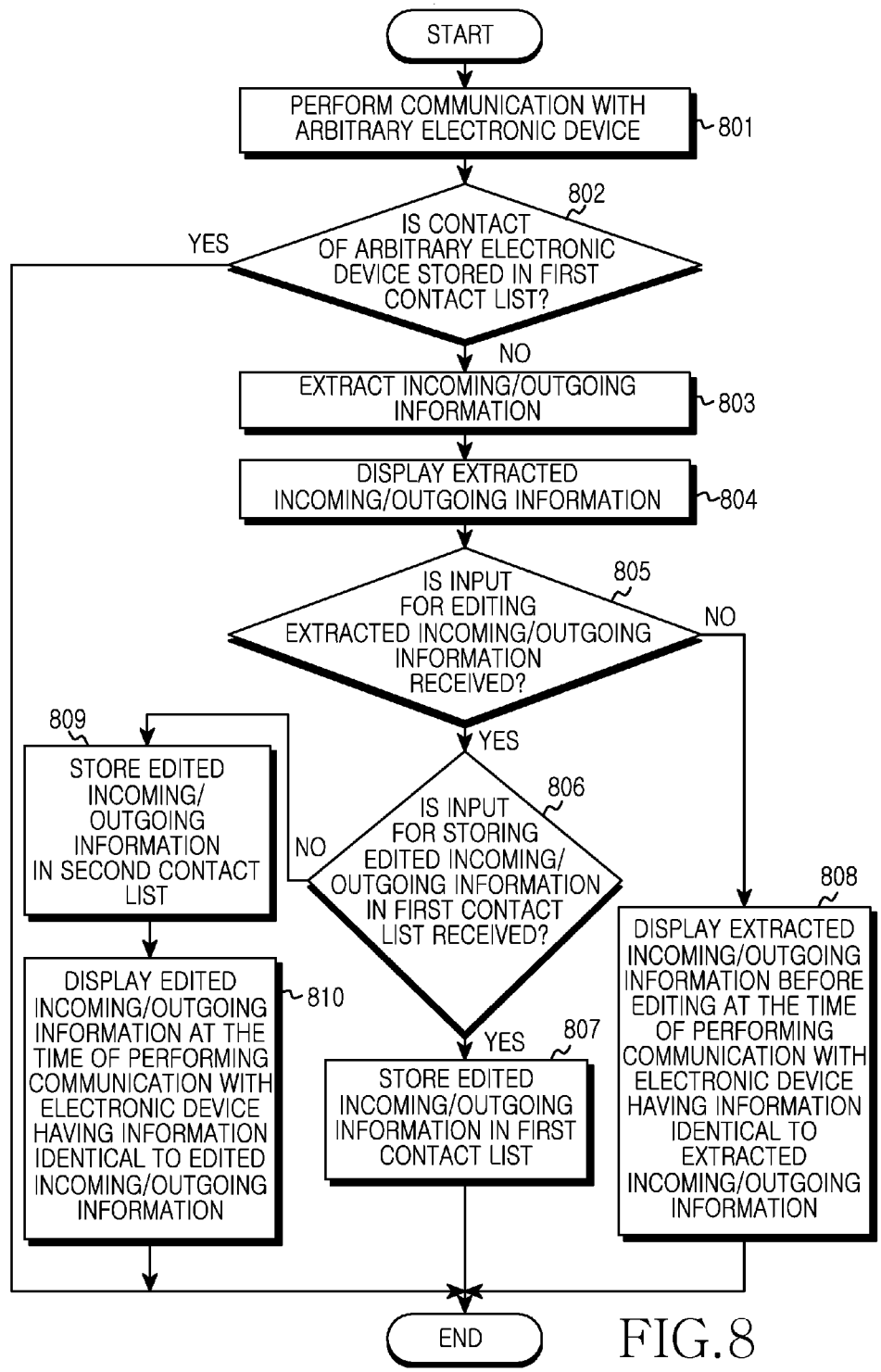
FIG. 8 is a flowchart illustrating a method of an electronic device according to an embodiment of the present invention.

FIG. 8 is a flowchart illustrating a method of an electronic device according to an embodiment of the present invention. Referring to FIG. 8, the electronic device performs communication with a communicating electronic device in step 801. Herein, performing communication with a communicating electronic device refers to transmitting a call or a message to the communicating electronic device and/or receiving a call or a message from the communicating electronic device.

In step 802, the electronic device determines whether the communicating electronic device is included as a contact in the first contact list. Specifically, the electronic device may determine whether the telephone number of the communicating electronic device is included in the first contact list. Herein, the first contact list may be a contact list that stores at least one contact that may be automatically synchronized with at least one accessible application.

If the electronic device determines that the communicating electronic device is not included as a contact in the first contact list in step 802, the electronic device extracts incoming/outgoing information in step 803. For example, if the electronic device receives a message, like "Your home delivered article has been arrived at a guesthouse. Please, pick the home delivered article up", from an electronic device assigned telephone number "012-3456-7890", the electronic device determines whether the telephone number "012-3456-7890" is included in the first contact list. If the above-described contact is not included in the first contact list of the electronic device, the electronic device extracts incoming/outgoing information based on the metadata and/or contents of the message. Specifically, the electronic device may search the contents of messages transmitted to, and/or received from, the communicating electronic device and extract information associated with the communicating electronic device based on the searched contents of the messages. Herein, searching the contents of messages transmitted to and/or received from the communicating electronic device may refer to searching for a symbol in the contents of the messages or searching for at least one of a term representing a rank, a term representing a name, and a term representing a company name in the contents of the messages. In addition, extracting information associated with the communicating electronic device based on the searched contents of the messages may refer to extracting at least one of a term representing a rank, a term representing a name, and a term representing a company name.

In the above-described example, the electronic device may extract the incoming/outgoing information of the electronic device assigned a telephone number "012-3456-7890" based on the contents of messages received from the electronic device assigned the telephone number "012-3456-7890". Specifically, the electronic device may identify that the term "home delivery" is repeated in the contents of the received message in step 803 and then display the telephone number "012-3456-7890" along with "home delivery" that is not stored in the first contact list of the electronic device on the touchscreen of the electronic device in step 804.

In addition, the electronic device may perform step 803 by executing a web browser provided in the electronic device, and searching for at least one of a name found in the contents of the message and the telephone number of the electronic device using the web browser. Thereafter, the electronic device may extract at least one of a web page address corresponding to the name and a main telephone number of the electronic device from the Internet. For example, the electronic device may search for the name "bank A" and the telephone number "1234-5678" using the web browser and extract the home page address and main telephone number of "bank A". That is, the electronic device may extract additional information using the web browser based on the contents of the received message, such as a name found in the message, and the telephone number. For example, the electronic device may extract additional information, such as the home page address "www.A.co.kr" corresponding to "bank A" using the web browser.

In addition, the electronic device may perform step 803 by accessing a database which may be stored in the electronic device, and searching for at least one of the name found in the contents of the message and the telephone number of the electronic device using the database. Thereafter, the electronic device may extract at least one of a web page address corresponding to the name and a main telephone number of the electronic device from the database. In some embodiments, the database may be stored in the electronic device and may be created and updated by downloading relevant information from a certain server. In the same or different embodiments, the electronic device may receive updated relevant information through a streaming service from the certain server in real time without storing a relevant database. In the above-described example, the electronic device may search for the found name "bank A" and the telephone number "1234-5678" using the stored database and extract the home page address and main telephone number of "bank A". That is, the electronic device may extract additional information using the stored database based on the contents of the received message, such as a name found from the message, and the telephone number. For example, the electronic device may extract additional information, such as home page address "www.A.co.kr" corresponding to "bank A" using the database.

After extracting the incoming/outgoing information in step 803, the electronic device displays the extracted incoming/outgoing information in step 804. For example, the electronic device may display the telephone number "1234-5678" that is not stored in a first contact list of the electronic device, along with the name "home delivery" on the touchscreen of the electronic device.

In step 805, the electronic device determines whether an input configured for editing the extracted incoming/outgoing information is received from the user. According to embodiments of the present invention, the electronic device may receive an input for editing the extracted incoming/outgoing information when the incoming/outgoing information is not precisely extracted or even though the incoming/outgoing information is precisely extracted but the user wishes to edit the extracted incoming/outgoing information.

After the electronic device receives input configured for editing the extracted incoming/outgoing information in step 805 and the editing is performed, the electronic device then determines whether an input configured for storing edited incoming/outgoing information in the first contact list is received from the user in step 806.

If an input configured for storing the edited incoming/outgoing information in the first contact list is received in step 806, the electronic device stores the edited incoming/outgoing information in the first contact list in step 807. Specifically, when the electronic device receives the input for storing the edited incoming/outgoing information in the first contact list, the electronic device stores the edited incoming/outgoing information in the first contact list that stores at least one contact which is automatically synchronized with at least one accessible application. In this case, one benefit of storing the edited incoming/outgoing information in the first contact list is provided when a new contact is used continuously. Another benefit of storing the edited incoming/outgoing information in the first contact list is when there is a need to use the newly recorded contact in the electronic device for a long period of time, not for a short period of time.

If the electronic device determines that the input for editing the extracted incoming/outgoing information is not received in the above-described determination step 805, the electronic device displays the extracted incoming/outgoing information without editing, and performs communication with the communicating electronic device in step 808. For example, if the electronic device performs communication with an electronic device assigned the telephone number "012-3456-7890", extracts incoming/outgoing information "home delivery", and displays it on the touchscreen of the electronic device, and the incoming/outgoing information "home delivery" is not edited, when the electronic device again receives a message from the electronic device assigned the telephone number "012-3456-7890", the electronic device displays the message and the name "home delivery" marked with a specific symbol so as to be distinguished from contacts stored in the first contact list and the second contact list.

If the electronic device does not receive the input for storing the edited incoming/outgoing information in the first contact list in the above-described determination step 806, the electronic device stores the edited incoming/outgoing information in a second contact list in step 809. Specifically, when the electronic device does not receive the input for storing the edited incoming/outgoing information in the first contact list after receiving the input for editing the extracted incoming/outgoing information, the electronic device stores the edited incoming/outgoing information in the second contact list that stores at least one contact which is not automatically synchronized with at least one accessible application.

Thereafter, when the electronic device performs communication with an electronic device having information identical to the edited incoming/outgoing information, the electronic device displays the edited incoming/outgoing information in step 810. For example, if the electronic device performs communication with an electronic device assigned the telephone number "012-3456-7890", extracts incoming/outgoing information "home delivery", and displays it on the touchscreen of the electronic device, but the incoming/outgoing information "home delivery" is not edited, when the electronic device again receives a message from the electronic device assigned the telephone number "012-3456-7890", the electronic device displays the received message and the name "home delivery" marked with a specific symbol so as to be distinguished from contacts stored in the first contact list and the second contact list. Conventionally, when an electronic device performs communication with a communicating electronic device that is not stored in a contact list, only the telephone number assigned to the communicating electronic device is recorded. Therefore, when the electronic device again attempts to communicate with the communicating electronic device, it is difficult to determine the entity corresponding to the telephone number in the call/message records. In addition, when the new contact does not need to be stored for subsequent communication, it is inconvenient for a user to store the new contact in a primary contact list when it is only for use for a short period of time. When the user stores the new contact in the primary contact list, the new contact is automatically synchronized with at least one accessible application in the electronic device. Therefore, a user feels uncomfortable because the synchronization is performed even though a person corresponding to the contact has no acquaintance with the user.

However, when performing communication with an electronic device assigned a telephone number not appearing on a contact list, the electronic device according to embodiments of the present invention extracts incoming/outgoing information based on metadata and/or contents of the communication, thereby improving the convenience of the user. Specifically, the electronic device may automatically extract incoming/outgoing information based on metadata and/or contents of messages or telephone conversations and stores the incoming/outgoing information in any one of the first and second contact lists.

Figure 9:
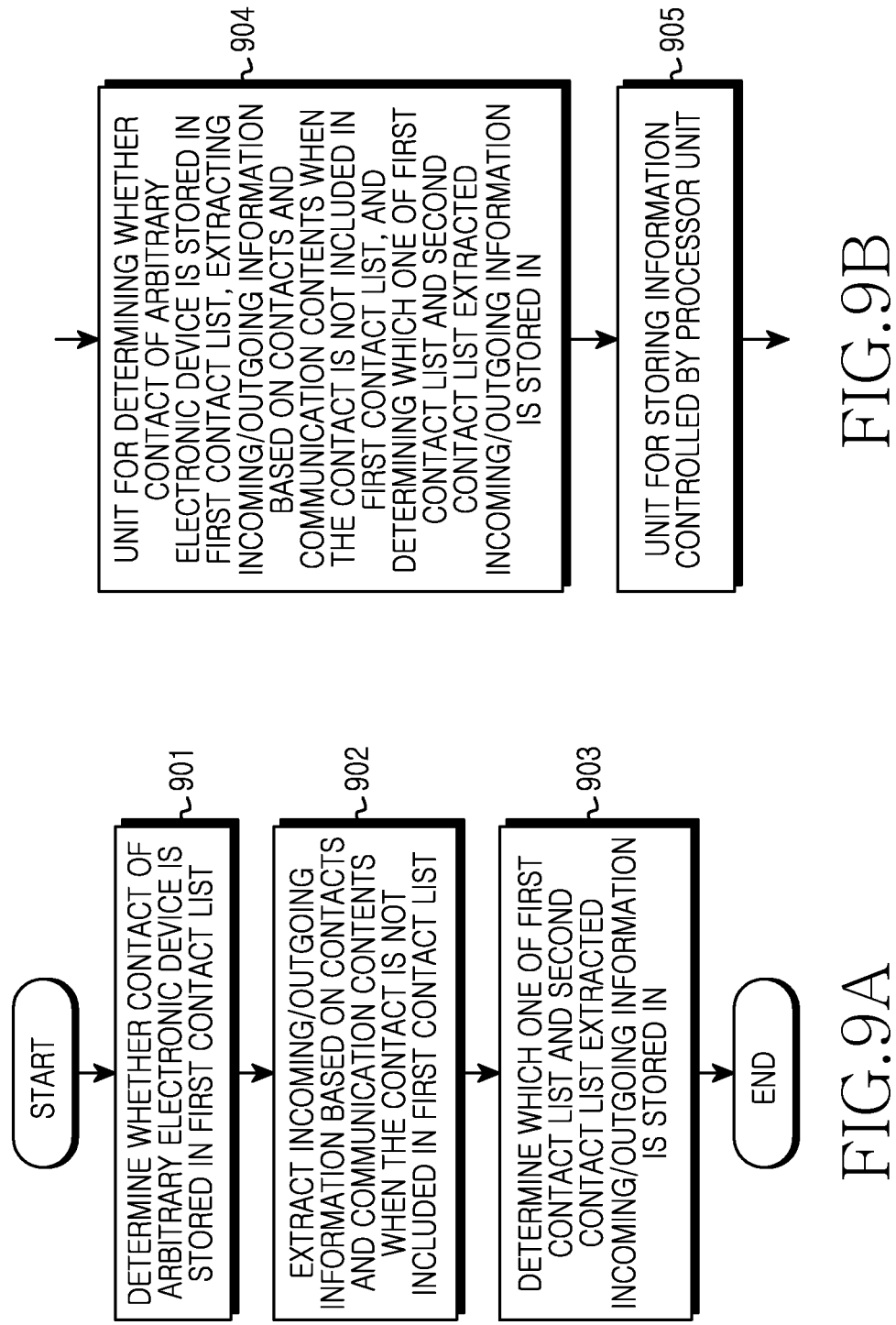
FIG. 9A is a flowchart illustrating a method for an electronic device for extracting incoming/outgoing information and managing contacts according to an embodiment of the present invention.
FIG. 9B is a diagram illustrating a configuration of an electronic device for extracting incoming/outgoing information and managing contacts according to an embodiment of the present invention.

FIG. 9A is a flowchart illustrating a method for an electronic device to extract incoming/outgoing information and manage contacts according to an embodiment of the present invention. In step 901, the electronic device determines whether the contact of a communicating electronic device is included in a first contact list. Specifically, the electronic device determines whether the telephone number of the communicating electronic device is included in the first contact list, which stores at least one contact that may be automatically synchronized with at least one accessible application.

If the contact is not included in the first contact list in step 901, the electronic device extracts incoming/outgoing information based on at least one of metadata and contents of the communication in step 902. For example, after performing voice communication with the communicating electronic device assigned telephone number "1234-5678", the electronic device determines that the telephone number "1234-5678" is not stored in the first contact list, and thus the electronic device performs STT (Speech To Text) conversion to convert the telephone conversation audio contents to text. Thereafter, the electronic device extracts information associated with the communicating electronic device based on the searched contents of the text. For example, the electronic device may determine that the telephone number "1234-5678" is a contact associated with the legal profession by identifying that the terms "law firm", "lawyer", and "judgment materials" found in the contents of the telephone conversation converted text are associated with the law. Therefore, the electronic device may automatically extract "lawyer Mr. B" as the name of the electronic device corresponding to the telephone number "1234-5678" from the contents of the text. In addition, the electronic device may use a web browser provided in the electronic device to search for information concerning the communicating electronic device. In addition, the electronic device may access a database to search for information concerning the communicating electronic device.

In step 903, the electronic device determines which one of the first contact list and a second contact list the extracted incoming/outgoing information is to be stored in. Specifically, the electronic device determines whether the extracted incoming/outgoing information is to be stored in a contact list which is automatically synchronized with at least one accessible application or a contact list which is not automatically synchronized with at least one accessible application. After the electronic device that has displayed the extracted incoming/outgoing information determines that an input for editing extracted incoming/outgoing information is received, the electronic device determines whether an input for storing edited incoming/outgoing information in the first contact list is received. Thereafter, if the electronic device receives the input for storing edited incoming/outgoing information in the first contact list, the electronic device stores the edited incoming/outgoing information in the first contact list which is automatically synchronized with at least one accessible application. In this case, a benefit of storing the edited incoming/outgoing information in the first contact list is provided when a new contact is used continuously.

When the electronic device receives an input for editing the extracted incoming/outgoing information, but does not receive the input for storing the edited incoming/outgoing information in the first contact list, the electronic device stores the edited incoming/outgoing information in a second contact list which is not automatically synchronized with at least one accessible application. Thereafter, when the electronic device performs communication with an electronic device having information identical to the edited incoming/outgoing information in the second contact list, the electronic device displays the edited incoming/outgoing information on the touchscreen of the electronic device marked with a specific symbol so as to be distinguished from names stored in the first contact list. In addition, when the electronic device displays recent call/message records on the touchscreen, the electronic device displays an indication that a message is received from a contact on the second contact list on the touchscreen of the electronic device. When the electronic device determines that the input for editing the extracted incoming/outgoing information is not received, and later on performs communication with an electronic device having information identical to the extracted incoming/outgoing information, the electronic device displays the unedited extracted incoming/outgoing information marked with a specific symbol so as to be distinguished from contacts stored in the first contact list and the second contact list.

FIG. 9B is a diagram illustrating a configuration of an electronic device for extracting incoming/outgoing information and managing contacts according to an embodiment of the present invention. First, the processor unit determines whether the contact of a communicating electronic device is included in a first contact list, extracts incoming/outgoing information based on metadata and/or contents of the communication when the communicating electronic device is not included in the first contact list, and then determines which one of the first contact list and a second contact list the extracted incoming/outgoing information is stored in 904. Specifically, the processor unit determines whether the contact of the communicating electronic device is included in the first contact list. If the processor unit determines that the contact is not included in the first contact list, the processor unit extracts incoming/outgoing information based on at least one of metadata and contents of the communication, and determines which one of the first contact list or second contact list, the extracted incoming/outgoing information is to be stored in.

The memory of the electronic device may store information controlled by the processor unit 905. More specifically, the memory may store software. Components of the software may include an operation system (OS) module, a communication module, a graphic module, a user interface (UI) module, an mpeg module, a camera module, and one or more application modules.

Figure 10:
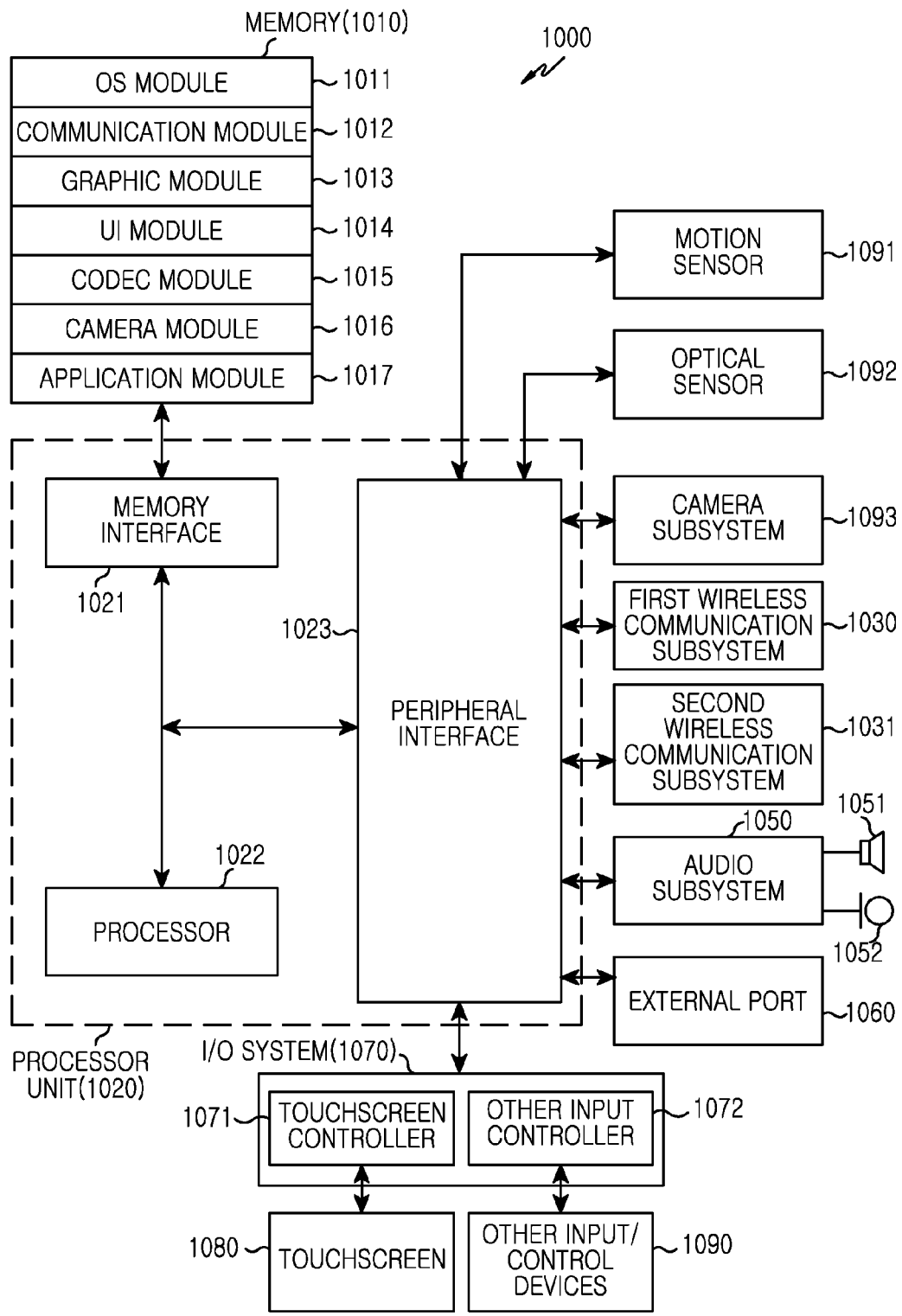
FIG. 10 is a block diagram illustrating a configuration of an electronic device according to an embodiment of the present invention.

FIG. 10 is a block diagram illustrating a configuration of an electronic device according to an embodiment of the present invention. The electronic device 1000 may be a portable electronic device, and examples thereof include a portable terminal, a mobile phone, a mobile pad, a media player, a tablet computer, a handheld computer, and a Personal Digital Assistant (PDA). In addition, the electronic device may be any portable electronic device having two or more functions among the above-described devices.

The electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an input/output (I/O) system 1070, a touchscreen 1080, and other input/control devices 1090. There may be multiple memory units 1010 and/or external ports 1060.

The processor unit 1020 includes a memory interface 1021, at least one processor 1022, and a peripheral interface 1023. In some embodiments, the processor unit 1020 may also be referred to as a processor. According to an embodiment of the present invention, the processor unit 1020 determines whether a communicating electronic device is included as a contact in a first contact list, extracts incoming/outgoing information based on metadata and/or contents of the communication with the communicating electronic device when the contact is not included in the first contact list, and determines which one of a first contact list and a second contact list the extracted incoming/outgoing information is to be stored in. In addition, the processor unit 1020 may convert the audio contents of calls to or from the communicating electronic device to text, search the contents of the converted text, and extract information associated with the communicating electronic device based on the searched contents of the text. In addition, the processor unit 1020 may search for a symbol in the contents of the text or search for at least one of a term representing a rank, a term representing a name, and a term representing a company name in the contents of the text. The processor unit 1020 may extract at least one term among a found term representing a rank, a found term representing a name, and a found term representing a company name. The processor unit 1020 may execute a web browser, search for at least one of a company name found in the contents of the text and the telephone number of the communicating electronic device using the web browser, and extract at least one of a web page address corresponding to the company name and the main telephone number of the communicating electronic device from the Internet.

The processor unit 1020 may access a stored database and search for at least one of a company name found in the contents of the text and the telephone number of the communicating electronic device in the database, and extract at least one of a web page address corresponding to the company name and the main telephone number of the communicating electronic device from the database. In addition, the processor unit 1020 may search the contents of messages transmitted and received to and from the communicating electronic device and extract information associated with the communicating electronic device based on the searched contents of the messages. In addition, the processor unit 1020 may search for a symbol in the contents of the message or search for at least one of a term representing a rank, a term representing a name, and a term representing a company name in the contents of the message. The processor unit 1020 may extract at least one term among a found term representing a rank, a found term representing a name, and a found term representing a company name.

The processor unit 1020 may execute a web browser, search for at least one of a company name found in the contents of the message and the telephone number of the communicating electronic device using the web browser, and extract at least one of a web page address corresponding to the company name and the main telephone number of the communicating electronic device from the Internet. The processor unit 1020 may access a stored database and search for at least one of a company name found in the contents of the message and the telephone number of the communicating electronic device in the database, and extract at least one of a web page address corresponding to the company name and the main telephone number of the communicating electronic device from the database. In addition, the processor unit 1020 may determine whether an input configured for editing the extracted incoming/outgoing information is received and, when the input configured for editing the extracted incoming/outgoing information is received, determine whether an input configured for storing the edited incoming/outgoing information in the first contact list is received. In addition, the processor unit 1020 may identify that an input configured for editing the extracted incoming/outgoing information is not received and that the input for storing the edited incoming/outgoing information in the first contact list is received.

The processor 1022 executes various software programs to perform various functions for the electronic device 1000, and performs processes and controls for voice communication and data communication. In addition to these general functions, the processor 1022 executes a specific software module (instruction set) stored in the memory 1010 and performs various specific functions corresponding to the software module. That is, the processor 1022 performs methods of embodiments according to the present invention in cooperation with software modules stored in the memory 1010.

The processor 1022 may include at least one data processor, image processor, or codec. The data processor, the image processor, or the codec may be configured separately. Also, the processor 1022 may comprise a plurality of processors performing different functions. The peripheral interface 1023 connects various peripheral devices and the I/O subsystem 1070 of the electronic device 1000 to the processor 1022 and the memory 1010 (through the memory interface).

The various components of the electronic device 1000 may be coupled by at least one communication bus (not illustrated) or serial data link (not illustrated).

The external port 1060 is used to connect the portable electronic device to other electronic devices directly or indirectly through a network (for example, Internet, Intranet, or wireless LAN). The external port 1060 may be, for example, a universal serial bus (USB) port or a FireWire port, but is not limited thereto.

A motion sensor 1091 and an optical sensor 1092 may be connected to the peripheral interface 1023 to enable various functions. For example, the motion sensor 1091 and the optical sensor 1092 may be connected to the peripheral interface 1023 to detect a motion of the electronic device, an amount of charge transfer and light from the outside. In addition, other sensors such as a positioning system, a temperature sensor, and a biosensor may be connected to the peripheral interface 1023 to perform relevant functions.

A camera subsystem 1093 may perform camera functions such as photographing and video clip recording.

The optical sensor 1092 may include a CCD (Charged Coupled Device) or a CMOS (Complementary Metal-Oxide Semiconductor) device.

A communication function is performed through one or more wireless communication subsystems 1030 and 1031. The wireless communication subsystems 1030 and 1031 may include a radio frequency (RF) receiver and transceiver and/or an optical (e.g., infrared) receiver and transceiver. The first wireless communication subsystem 1030 and the second wireless communication subsystem 1031 may be divided according to communication networks through which the electronic device 1000 communicate. For example, the communication networks may include, but are not limited to, a GSM (Global System for Mobile Communication) network, an EDGE (Enhanced Data GSM Environment) network, a CDMA (Code Division Multiple Access) network, a W-CDMA (Wideband-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The first wireless communication subsystem 1030 and the second wireless communication subsystem 1031 may be integrated with each other as one wireless communication subsystem.

The audio subsystem 1050 is connected to the speaker 1051 and the microphone 1052 to perform audio stream input/output functions such as voice recognition, voice replication, digital recording, and phone functions. The audio subsystem 1050 receives a data stream through the peripheral interface 1023 of the processor unit 1020 and converts the received data stream into electronic signals. The electronic signals are transmitted to the speaker 1051. The speaker 1051 converts the electronic signals into sound waves audible by humans and outputs the same. The microphone 1052 converts sound waves received from humans or other sound sources into electronic signals, which are received by audio subsystem 1050. The audio subsystem 1050 converts the received electronic signals into an audio data stream and transmits the audio data stream to the peripheral interface 1023. The audio subsystem 1050 may include an attachable/detachable earphone, a headphone, or a headset.

The I/O subsystem 1070 may include a touchscreen controller 1071 and/or an other input controller 1072. The touchscreen controller 1071 may be connected to the touchscreen 1080. The touchscreen 1080 and the touchscreen controller 1071 may detect a touch, a motion, or a stop thereof by using, but not being limited to, multi-touch detection technologies including a proximity sensor array or other elements, as well as capacitive, resistive, infrared and surface acoustic wave technologies for determining one or more touch points on the touchscreen 1080. The other input controller 1072 may be connected to the other input/control devices 1090. The other input/control devices 1090 may include one or more buttons, a rocker switch, a thumbwheel, a dial, a stick, and/or a pointer device such as a stylus.

The touchscreen 1080 provides an I/O interface between the electronic device 1000 and the user. That is, the touchscreen 1080 transmits a user touch input to the electronic device 1000. Also, the touchscreen 1080 is a medium that displays an output from the electronic device 1000 to the user. That is, the touchscreen 1080 displays a visual output to the user. The visual output may be represented by a text, a graphic, a video, or a combination thereof.

The touchscreen 1080 may use various display technologies. For example, the touchscreen 1080 may use, but not limited to, an LCD (Liquid Crystal Display), an LED (Light Emitting Diode), an LPD (Light emitting Polymer Display), an OLED (Organic Light Emitting Diode), an AMOLED (Active Matrix Organic Light Emitting Diode), or an FLED (Flexible LED). According to embodiments of the present invention, the touchscreen 1080 displays the extracted incoming/outgoing information. When a call or message is transmitted to or received from an electronic device, the touchscreen 1080 may display incoming/outgoing information extracted from such a call or message. When the extracted incoming/outgoing information is edited, the touchscreen 1080 may display the edited incoming/outgoing information.

The memory 1010 may be connected to the memory interface 1021. The memory unit 1010 may include one or more high-speed random-access memories (RAMs) such as magnetic disk storage devices, one more nonvolatile memories, one or more optical storage devices, and/or one or more flash memories (for example, NAND flash memories or NOR flash memories).

The memory 1010 stores software. Components of the software include an operation system (OS) module 1011, a communication module 1012, a graphic module 1013, a user interface (UI) module 1014, a codec module 1015 (such as an MPEG module), a camera module 1016, and one or more application modules 1017. Also, since the module that is a component of the software may be represented as a set of instructions, the module may be referred to as an instruction set. The module may also be referred to as a program. The OS module 1011 (for example, WINDOWS, LINUX, Darwin, RTXC, UNIX, OS X, or an embedded OS such as VxWorks) includes various software components for controlling general system operations. For example, general system operation controls may include memory control/management, storage hardware (device) control/management, and power control/management. The OS module also performs a function for enabling smooth communication between various hardware components (devices) and software components (modules). According to embodiments of the present invention, the memory 1010 may store edited incoming/outgoing information in the first contact list and extracted incoming/outgoing information in the second contact list when the input for storing edited incoming/outgoing information in the first contact list is received.

The communication module 1012 may enable communication with other electronic devices, such as computers, servers, and/or portable terminals, through the wireless communication subsystems 1030 and 1031 or the external port 1060. The communication module 1020 according to the present invention may perform communication with a communicating electronic device and transmit and receive a call or a message to and from the communicating electronic device. In addition, the communication module 1012 may perform communication with an electronic device having information identical to extracted incoming/outgoing information and perform communication with an electronic device having information identical to edited incoming/outgoing information.

The graphic module 1013 includes various software components for providing and displaying graphics on the touchscreen 1080. The graphics include texts, web pages, icons, digital images, videos, and animations.

The UI module 1014 includes various software components related to an user interface. Through the UI module, the electronic device provides information about how the state of an user interface changes and/or information about under what condition the state of a user interface changes.

The codec module 1015 may include software components related to video file encoding/decoding. The codec module may include a video stream module such as an MPEG module or an H204 module. Also, the codec module may include various audio file codec modules such as AAA, AMR, and WMA. Also, the codec module 1015 includes an instruction set corresponding to the implementation methods of the present invention.

The camera module 1016 may include camera-related software components that enable camera-related processes and functions.

The application module 1017 may include a browser application, an e-mail application, an instant message application, a word processing application, a keyboard emulation application, an address book application, a touch list application, a widget application, a Digital Right Management (DRM) application, a voice recognition application, a voice replication application, a position determining function application, a Location-Based Service (LBS) application, and the like.

In addition, various functions of the electronic device 1000 according to embodiments of the present invention, which have been described above and may be recited below, may be implemented by any combination of hardware and/or software including one or more processors and/or an application-specific integrated circuit (ASIC).

While the invention has been shown and described with reference to certain embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus comprising:
  memory to store one or more contacts; and
  a processor configured to:
    receive a call request transmitted from an external electronic device;
    obtain first identification information corresponding to the external electronic device based on the cell request;
    determine whether the first identification information corresponds to at least one portion of at least one contact of the one or more contacts;
    if the first identification information does not correspond to the at least one portion of the at least one contact of the one or more contacts, identify second identification information corresponding to a user of the external electronic device based on one or more previously received messages; and
    present at least part of the second identification information in relation with the call request via an output interface operatively coupled with the processor.

2. The apparatus of claim 1, wherein the processor searches an e-mail or an instant message as at least part of identifying the second identification information from the one or more messages.

3. The apparatus of claim 1, further comprising:
  a display which comprises the output interface operatively coupled with the processor,
  wherein the processor presents the at least part of the second identification information via the display.

4. The apparatus of claim 1, wherein the first identification information comprises a telephone number of the external electronic device.

5. The apparatus of claim 1, wherein the one or more messages includes a message that was previously transmitted to the apparatus by a server.

6. The apparatus of claim 1, wherein the processor is further configured to:
  search the at least part of the second identification information from a corresponding message of the one or more messages, the corresponding message stored in the apparatus.

7. The apparatus of claim 1, wherein the processor is further configured to:

update the at least one portion of the at least one contact using the second identification information.

8. The apparatus of claim 1, wherein the one or more contacts comprises a first set of contacts, and wherein the processor is further configured to:
assign at least some of the second identification information as at least part of a second set of contacts different from the first set of contacts.

9. The apparatus of claim 1, wherein the processor identifies at least some of the second identification information from the one or more messages based at least in part on context information related to content of the one or more messages.

10. The apparatus of claim 9, wherein the processor determines the context information using a word or a sentence used in the content.

11. A method comprising:
receiving, at an electronic device including memory to store one or more contacts, a call request transmitted from an external electronic device;
obtaining first identification information corresponding to the external electronic device;
determining whether the first identification information corresponds to at least one portion of at least one contact of the one or more contacts;
if the first identification information does not correspond to the at least one portion of the at least one contact of the one or more contacts, identifying second identification information corresponding to a user from one or more previously received messages; and
presenting at least part of the second identification information in relation with the call request via an output interface operatively coupled with the electronic device.

12. The method of claim 11, wherein the one or more messages comprise a message received from a server via the Internet.

13. The method of claim 11, wherein identifying the second identification information comprises:
searching, using at least one portion of a corresponding message of the one or more messages or the first identification information, the at least part of the second identification information from a server via the Internet.

14. The method of claim 11, wherein identifying the second identification information comprises:
searching the at least part of the second identification information from a corresponding message of the one or more messages, the corresponding message stored in the electronic device.

15. The method of claim 11, wherein identifying the second identification information comprises:
extracting at least some of the second identification information from the one or more messages based at least in part on context information, the context information determined using a word or a sentence used in the content of the one or more messages.

16. The method of claim 11, wherein identifying the second identification information comprises:
extracting, as at least some of the second identification information, a name corresponding to the user from the one or more messages.

17. The method of claim 11, further comprising:
storing at least some of the second identification information in association with the at least one contact in the stored one or more contacts.

18. The method of claim 11, wherein the one or more messages comprise an audio message, and wherein the identifying comprises:
generating text information based at least in part on a portion of the audio message using a speech-to-text technology.

19. The method of claim 11, further comprising:
presenting, in response to an input, at least some of the second identification information in association with the first identification information as part of a call history.

20. A machine-readable storage device storing instructions that, when executed by one or more processors, cause the one or more processors to perform operations comprising:
receiving, at an electronic device including memory to store one or more contacts, a call request transmitted from an external electronic device;
obtaining first identification information corresponding to the external electronic device;
determining whether the first identification information corresponds to at least one portion of at least one contact of the one or more contacts;
based at least in part on a determination that the first identification information does not correspond to the at least one portion of the contacts, identifying second identification information corresponding to a user from one or more previously received messages; and
presenting at least part of the second identification information in relation with the call.

* * * * *